US007097028B2

(12) United States Patent
Henry et al.

(10) Patent No.: US 7,097,028 B2
(45) Date of Patent: Aug. 29, 2006

(54) GRIPPING ELEMENT FOR CONTINUOUS MOTION INSERTING FINGER

(75) Inventors: Bradford D. Henry, Cary, NC (US); Penny P. Fusco, Morrisville, NC (US); Frank Shinn, Fuquay-Varina, NC (US)

(73) Assignee: Bowe Bell + Howell Company, Durham, NC (US)

( * ) Notice: Subject to any disclaimer, the term of this patent is extended or adjusted under 35 U.S.C. 154(b) by 0 days.

(21) Appl. No.: 10/823,791

(22) Filed: Apr. 14, 2004

(65) Prior Publication Data

US 2005/0067257 A1 Mar. 31, 2005

Related U.S. Application Data

(60) Provisional application No. 60/462,338, filed on Apr. 14, 2003.

(51) Int. Cl.
*B65G 19/08* (2006.01)

(52) U.S. Cl. ................ 198/733; 198/729; 198/867.05; 198/470.1

(58) Field of Classification Search ................ 198/729, 198/730, 731, 732, 733, 470.1, 474.1, 867.02, 198/867.05, 803.7; 271/198
See application file for complete search history.

(56) References Cited

U.S. PATENT DOCUMENTS 2,455,127 A * 11/1948 Laxo .......................... 198/733
5,806,659 A 9/1998 Middelberg et al.
5,964,461 A * 10/1999 Ende et al. ................. 271/198
6,237,746 B1 * 5/2001 Sussmeier ................... 198/732
6,283,276 B1 9/2001 McCay
6,378,693 B1 * 4/2002 Ballestrazzi et al. ........ 198/732
6,851,544 B1 * 2/2005 Noll, Jr. ................. 198/470.1

* cited by examiner

*Primary Examiner*—James R. Bidwell
(74) *Attorney, Agent, or Firm*—McDermott Will & Emery LLP

(57) ABSTRACT

An envelope insert conveyor assembly includes a first pair of rotation members and a second pair of rotation members spaced apart from one another. A first conveying member is disposed around the first pair of rotation members, and a second conveying member is disposed around the second pair of rotation members, so that the conveying members rotate around the first rotation member and the second rotation member. A plurality of pusher members are fixed to each of the first conveying member and second conveying member. The pusher members each have paired sidewalls, a cross-wall connecting the paired walls, and an indented portion provided in each of the paired sidewalls. A gripping element is disposed adjacent an indented portion of one of the paired sidewalls and biased toward an interior surface of the indented portion.

20 Claims, 10 Drawing Sheets

GRIPPING ELEMENT FOR CONTINUOUS MOTION INSERTING FINGER

CROSS REFERENCE TO RELATED APPLICATIONS

This application claims priority from and is related to U.S. Provisional Application No. 60/462,338, filed Apr. 14, 2003, entitled "GRIPPING ELEMENT FOR CONTINUOUS MOTION INSERTING FINGER", by inventors Bradford D. Henry et al. The contents of the provisional application are hereby incorporated by reference in its entirety.

TECHNICAL FIELD

A method and a device for conveying and pushing one or more sheets of paper or folded inserts into an envelope are provided, and more particularly a pusher finger guide conveying and pushing one or more sheets of paper or folded inserts into an envelope in a continuous motion system is provided.

BACKGROUND

The use of chain or belt mounted pusher elements is well known in the art of paper handling. Such pushers are used to push a sheet, group of sheets, or folded insert from an upstream position, down a guide path, and into an envelope, which is typically held stationary for an instant to permit insertion of the sheet, group of sheets, or folded insert.

One conventional device, disclosed in U.S. Pat. No. 6,283,276, assigned on its face to Bell & Howell Mail and Messaging Technologies Co. of Durham, N.C., and incorporated herein by reference in its entirety, utilizes two side-by-side overhead pusher finger guides or pushers used in tandem so that the insert (whether a flat or folded sheet or group of sheets) received at the upstream position will not skew prior to or at the time of insertion of the insert into the waiting envelope. Another conventional chain-driven device, disclosed in U.S. Pat. No. 5,806,659, also assigned on its face to Bell & Howell Mail and Messaging Technologies Co. of Durham, N.C., and incorporated herein by reference in its entirety, utilizes a lightweight chain apparatus bearing a plurality of spaced-apart pusher members attached to the chain and a guide element intended to improve dimensional stability of the pusher members.

A conventional overhead conveyor 10 in accord with U.S. Pat. No. 6,283,276 is depicted in FIG. 1. First and second circular drive members, such as sprockets 15, 20, are mounted on rotatable drive shafts 16, 17, respectively. Sprockets 15, 20 are positioned such that the X axis is tangent to the lowermost point of each of sprockets 15, 20 and, therefore, the lowermost point of each of sprockets 15, 20, lie along the same point of the Z (vertical) axis. Drive shaft 16 is connected to drive motor 25, and endless conveyor chain 30 is wrapped around the teeth of sprockets 15, 20 and comprises upper conveyor chain run 30*a* and lower conveyor chain run 30*b*. Slack in upper conveyor chain run 30*a* is prevented by use of one or more idler sprockets 32, 34 and, with suitable positioning thereof, lower conveyor chain run 30*b* will be parallel to the X axis, which itself is parallel to the downstream paper feed direction F. Alternatively, overhead conveyor 10 may be an endless belt-based conveyor, in which case, the circular drive members would comprise pulleys.

A plurality of pusher elements 40 are attached to conveyor chains 30 at a fixed spaced-apart distance. Each pusher element has a lower portion 40*a* for supporting the bottom of a sheet(s) and an indented portion 40*b* for receiving the rear portion of sheet(s) and pushing the same in paper feed direction F. To control the degrees of freedom of movement allowed of pusher 40, a guide 100 is provided for assuring pusher element 40 moves only in the X direction with no deflection in the Y or -Z directions. Guide 100 comprises a guiding element 50 of a selected cross-sectional shape (e.g., a circular cross-section). Sidewalls 42 of the pushers 40 are configured to straddle the respective guiding element 50.

Motor 25 drives conveyor chain 30 and guide elements 40 (rigidly fixed to endless conveyor chain 30) in the counterclockwise direction through drive shaft 16 and sprockets 15, 20.

At the beginning of a feed cycle for an incoming sheet or plurality of sheets or folded sheet of plurality of sheets in direction F, pusher element 40 on an upper run 30*a* of endless conveyor chain 30 starts to pass downwardly around sprocket 20 and approaches guide element 50 of guide 100 at the bottom half of sprocket 20. The sidewalls 42 of pusher element 40 start to receive therebetween (e.g., straddle) guide element 50, and thereafter a horizontal cross wall 39 of pusher element 40 comes into contact with the top of guide element 50. Once pusher element 40 passes around sprocket 20 and into lower run 30*b* of endless conveyor chain 30, indented portion 40*b* of pusher element 40 contacts the sheet and pushes it in direction X (paper feed direction F) until it reaches a designated release point (not shown), at which time the sheet S is released and pusher element 40 moves upwardly around sprocket 15 and out of engagement with guide element 150 to permit repetition of the cycle.

Despite the improvements realized by the above configuration, there still remains room for improvement in the art, particularly given the movement of sheets, packets, or inserts under increasingly large accelerations and speeds, both absolute and differential or relative, despite the above-noted improvements to the dimensional stability of the pushers. Thus, there exists a need for a pusher finger guide that reduces opportunity for sheet skew.

SUMMARY

This need is met by the pushing member bearing a gripping element disclosed herein, of which various exemplary aspects thereof are set forth to impress upon one skilled in the art the broad scope of the invention.

In one example, there is provided an envelope insert conveyor assembly includes a first pair of rotation members and a second pair of rotation members spaced apart from one another. A first conveying member is disposed around the first pair of rotation members and a second conveying member is disposed around the second pair of rotation members to so as to rotate around the first rotation member and the second rotation member. A plurality of pusher members are fixed to each of the first conveying member and second conveying member. The pusher members each have paired sidewalls, a cross-wall connecting the paired walls, and an indented portion provided in each of the paired sidewalls. A gripping element is disposed adjacent an indented portion of one of the paired sidewalls and biased toward an interior surface of the indented portion.

In another example, there is provided a pusher member for conveying an envelope insert, comprising paired sidewalls and a cross-wall connecting the paired walls. Each of the paired sidewalls comprises, at a proximal end, downwardly protruding extensions comprising an attachment member. Each of the paired sidewalls also comprises a forwardly disposed generally U-shaped indented portion, wherein one of the generally U-shaped indented portions comprises a gripping element having a gripping member which is resiliently biased toward an interior surface of the indented portion.

Other aspects and advantages of the present disclosure will become apparent to those skilled in this art from the following description of preferred aspects taken in conjunction with the accompanying drawings. As will be realized, the disclosed concepts are capable of other and different embodiments, and its details are capable of modifications in various obvious respects, all without departing from the spirit thereof. Accordingly, the drawings, disclosed aspects, and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein:

FIGS. 5(*c*)–5(*d*) of the drawings show a front and a rear view of a pusher guide assembly in accord with the embodiment;

DETAILED DESCRIPTION OF THE DRAWINGS

With reference to the attached drawings, an overhead pusher finger guide system comprising a gripping element for gripping an insert will now be described, with respect to an exemplary and non-limiting preferred embodiment.

Figure 1:
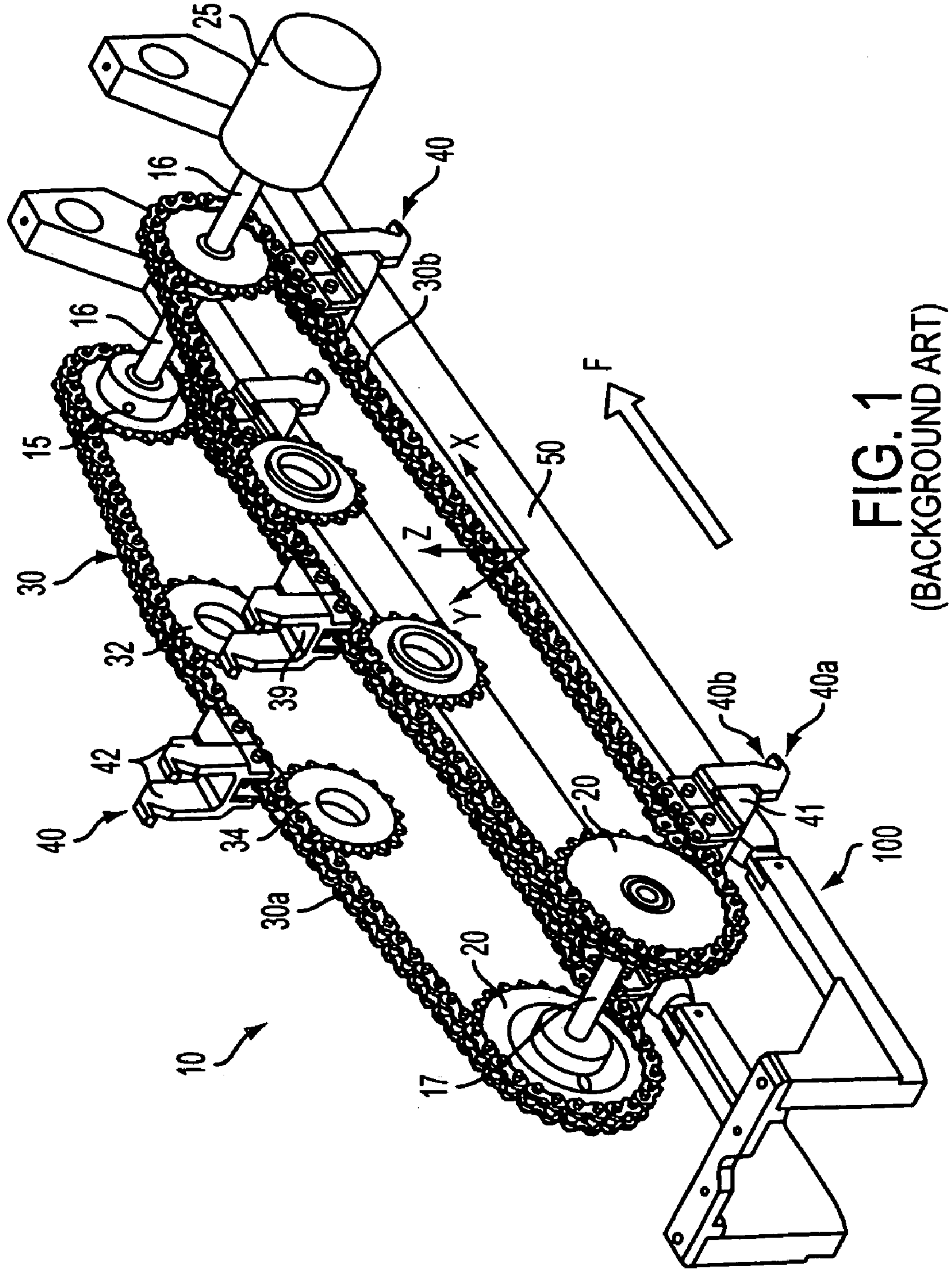
FIG. 1 (BACKGROUND ART)
FIG. 1 of the drawings is a perspective view of a conventional pusher guide assembly.
Figure 2:
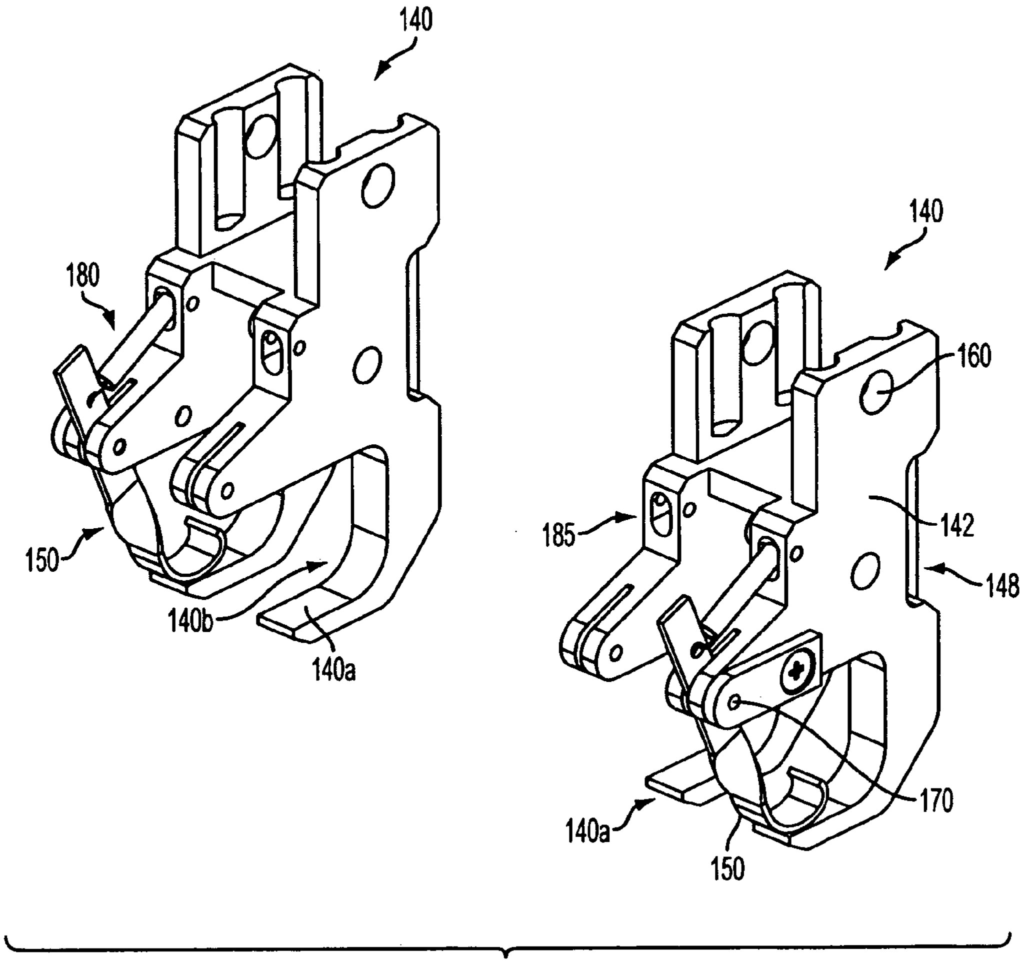
FIG. 2 of the drawings presents perspective views of a left and a right pusher guide assembly in accord with the present embodiment.

FIG. 2 depicts a set of left and a right pusher elements 140, each bearing a resilient gripping member 150 in accord with the inventive disclosure. The pusher elements 140 are, in one aspect, made of a Nylatron GS material. The gripping member 150 is, in one aspect, made from a stainless steel, such as a #300 series. More advantageously, it is preferred that the gripping member 150 (e.g., a stainless steel) be coated with a suitable low-friction coating (e.g., a 95% PEEK/5% PFTE powder coating for application to stainless steel) on a lower portion thereof to reduce friction. Such coating would, in one aspect, have a thickness between about 0.38 mm–0.51 mm, but could have a greater or lesser thickness. Alternatively, other lower friction coatings, known to those of ordinary skill in the art, could be employed.

Figure 3:
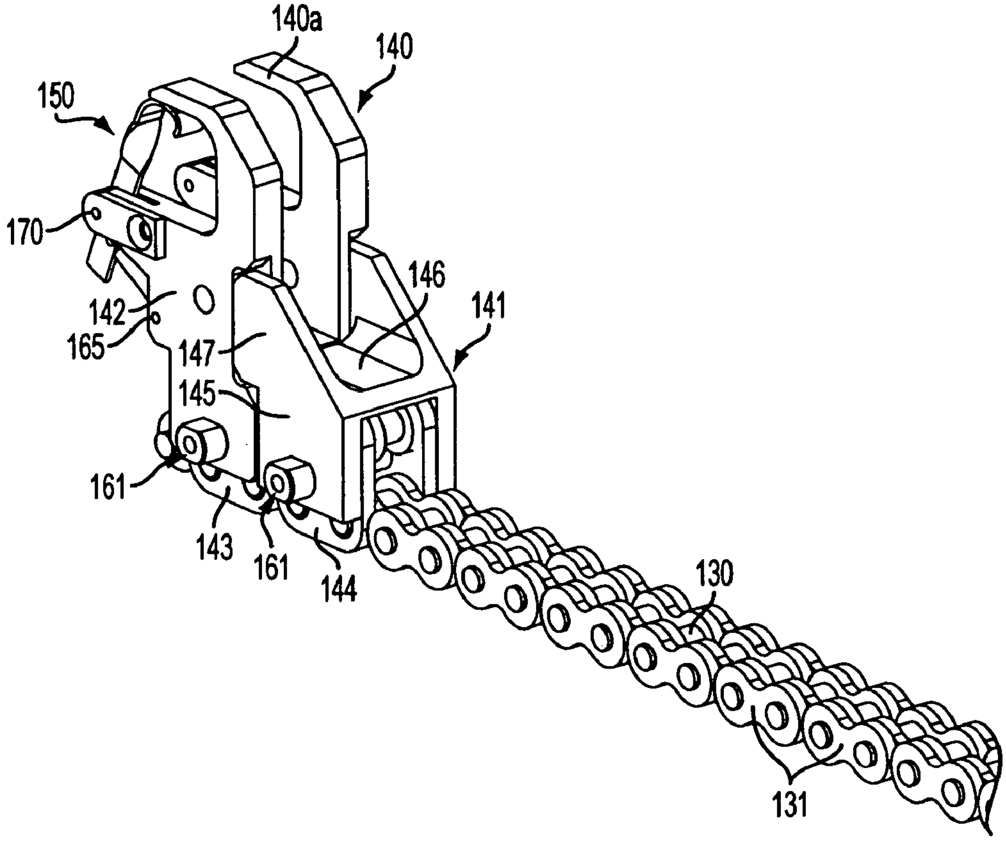
FIG. 3 of the drawings presents a perspective view of a pusher guide assembly attached to a drive chain in accord with the embodiment.
Figure 4:
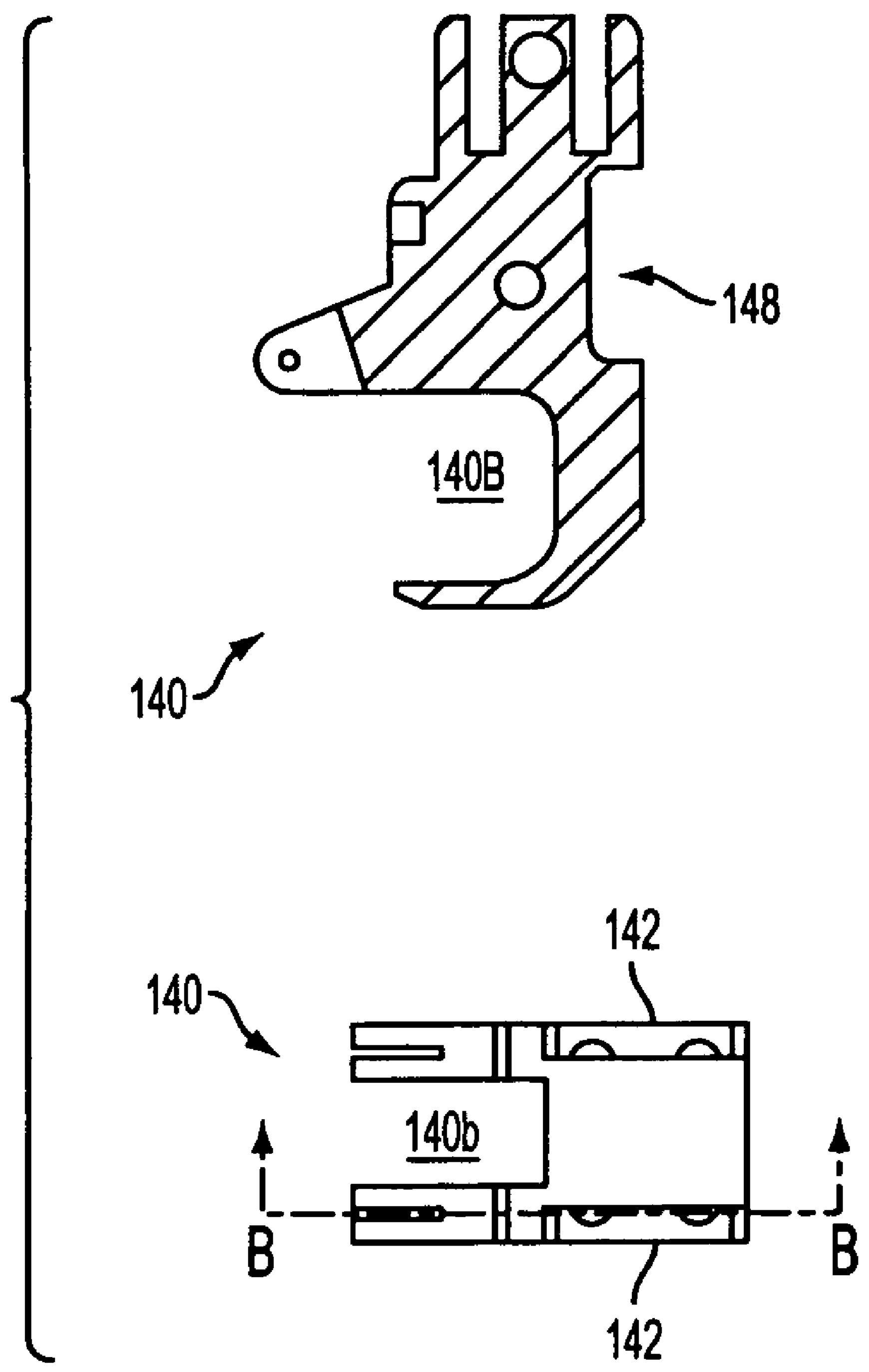
FIG. 4 of the drawings shows a top view of a pusher guide assembly in accord with the embodiment and a cross-sectional view thereof taken along line B—B.
Figure 5A:
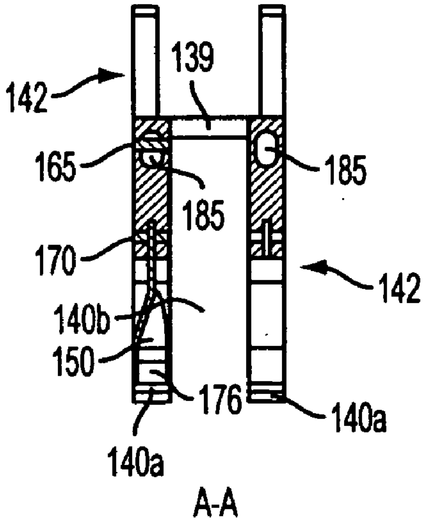
FIG. 5(*a*) of the drawings shows a front cross-sectional view taken along line A—A of FIG. 5(*b*), which presents a perspective side of a pusher guide assembly in accord with the embodiment.
Figure 5B:
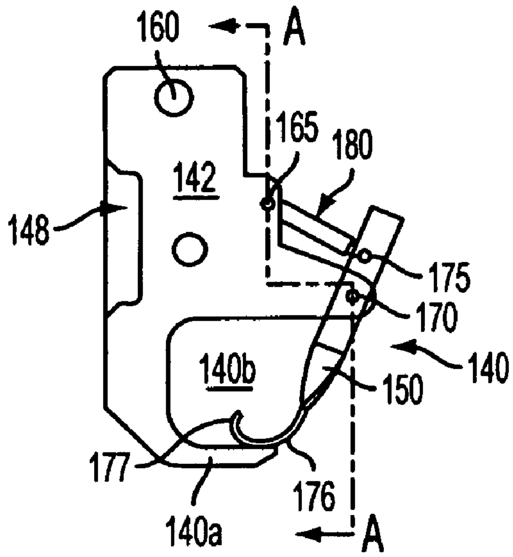
Figure 5C:
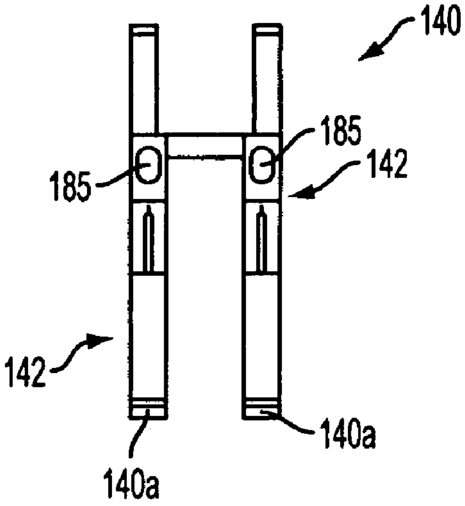
Figure 5D:
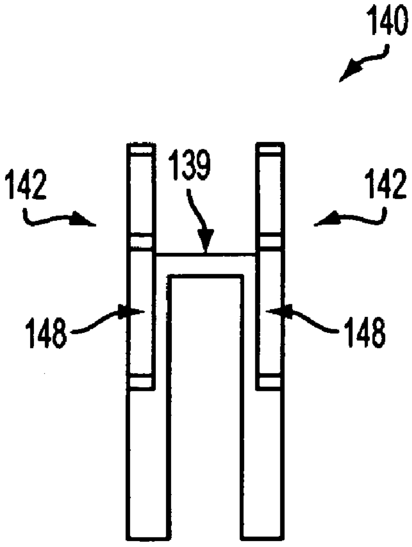

FIG. 3 shows one such pusher element 140 bearing a resilient gripping member 150 attached to a conveyor chain 130. In one aspect, the attachment means includes a set of downwardly protruding extensions 143 that correspond in shape and spacing to the outermost chain link elements 131. The outermost chain link elements 131 are removed and the downwardly protruding extensions 143 are substituted in place thereof.

In one aspect, a plurality of such pusher elements 140 are attached to the conveyor chain at a spaced-apart distance, which may be a fixed distance. Each pusher element has a lower portion 140*a* for supporting the bottom of a sheet or sheets, a packet, or a folded sheet or sheets (collectively referred to hereinafter as "insert" for brevity). An indented portion 140*b* is configured to receive a rear portion of the insert and push the same in a feed direction for insertion into an envelope.

As shown in FIG. 3, a supporting member 141 is attached to the conveyor chain 130 behind the pusher element 140. In one aspect, the attachment means includes a set of downwardly protruding extensions 144 that correspond in shape and spacing to the outermost chain link elements 131. The outermost chain link elements 131 are removed and the downwardly protruding extensions 144 are substituted in place thereof.

Supporting member 141 comprises a generally H-shaped element having two upwardly directed walls 145 and a horizontal cross-wall 146. The upwardly directed walls 145 comprise forward projections 147 that engage corresponding recesses 148 in the pusher element 140 when the conveyor chain 130 is substantially horizontal and disengage from the recesses 148 in the pusher element 140 when the conveyor chain 130 deviates from the substantially horizontal, such as when the conveyor chain 130 is passed about at least a portion of a circumference of a gear or sprocket. The combination of the supporting member 141, forward projections 147 and pusher element 140 recesses 148 provide increased rigidity to the pusher element 140, and therefore a greater degree of stability to the pusher element 140 and any object carried thereby. Although the depicted recesses 148 and forward projections 147 are provided approximately mid-way up the height of pusher element 140 sidewalls 142, this particular configuration is not required and the recesses 148 and forward projections 147 may be provided either higher or lower relative to the pusher element 140 sidewalls 142 in accord with the embodiment.

As shown in greater detail in FIGS. 5(*a*) and 5(*b*)–5(*c*), pusher element 140 comprises a generally H-shaped element having sidewalls 142 and a horizontal cross-wall 139. A portion of sidewalls 142 proximal to the conveying means, such as endless conveyor chain 130, are configured for attachment to the conveying means. As illustrated in FIG. 2, holes 160 are provided in sidewalls 142 to permit connection (such as by pinning 161, adhesives, bonding, or suitable welding techniques) of the sidewalls 142 to elements 143 which replace the outermost elements 131 of a conveying chain 130. Alternately, sidewalls 142 themselves may be formed for direct connection to the chain 130.

Figure 6A:
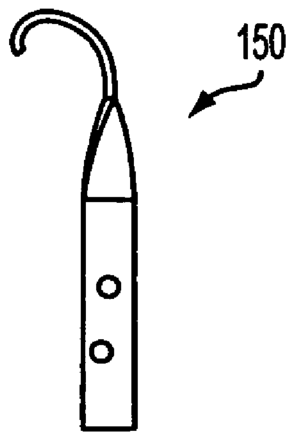
FIGS. 6(*a*)–6(*c*) of the drawings show a resilient gripper of a pusher guide assembly in accord with the embodiment.
Figure 6B:
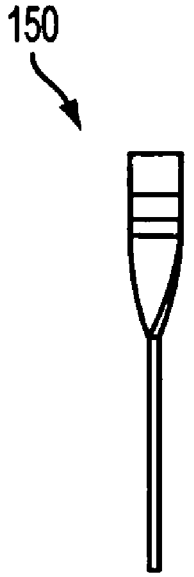
Figure 6C:
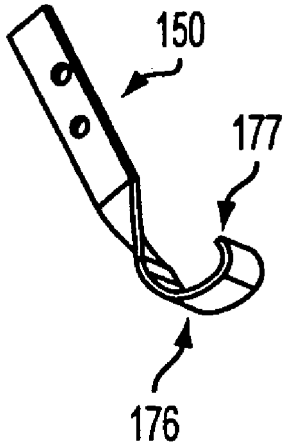

Gripping member 150, an embodiment of which depicted in FIGS. 5(*a*) and 5(*b*), comprises a pivot arm mounted for rotation about a pivot point formed by a pin 170 inserted through corresponding holes in a forward portion of the pusher element 140. Pin 170 may be, for example, a McMaster-Carr #90145A414. The pivot point generally defines an upper end of the pivot arm above the pivot point or pin 170 and a lower end of the pivot arm below the pivot point or pin 170. In one aspect, illustrated in detail in FIGS. 6(*a*)–6(*c*), the lower end of the gripping member 150 pivot arm has a curved lower portion 176 configured to contact an upper inner surface of pusher element 140 lower portion 140*a* so as to prevent continued rotational movement of the pivot arm gripping member 150 in a counter-clockwise direction past the lower portion 140*a*. A distal end of the curved lower portion 176 optionally curves upwardly away from pusher element 140 lower portion 140*a* to prevent contact of the edge of the curved lower portion from the insert received within indented portion 140*b*.

In alternative embodiments, gripping member 150 may comprise a pivot arm with a straight lower portion, an angled lower portion, or a ball disposed at the lower end of the pivot arm, for example. In still further alternative embodiments, a degree of rotation of the gripping member 150 pivot arm may be regulated by mating protrusions and/or combinations of protrusions and recesses on or in the gripping member 150 and inner surface of sidewalls 142.

On an upper end of the gripping member 150 pivot arm, above the pin 170, is a hole 175 through which one end of a conventional tension spring 180 having looped ends is engaged. The opposite end of spring 180 is attached to sidewall 142 by a pin inserted through a through-hole 165. As shown in FIG. 2, the opposite end of spring 180 enters a hole 185 in the forward edge of sidewall 142, the spring diameter being selected to be accommodated within said hole. The spring may include, for example, a Lee Spring # EI-011B-2-M, possessing a 2.38 mm outside diameter (OD). This spring, in combination with the embodiment depicted in FIGS. 2–6(*c*), provides a downwardly biased force against an insert of about 0.069 lb. at a zero position (i.e., in contact with the lower portion 140*a* of pusher member 140 and imparts a force of about 0.135 lb at full extension. Other arrangements and springs could be employed in accord with the embodiment to generate higher or lower downwardly biased forces, as appropriate to suitably engage and temporarily retain the inserts of interest to a particular application. Alternate springs include, but are not limited to Lee Spring Nos. EI-008A-1-M, EI-008A-2-M, EI-009A-2-M, and EI-009A-1-M, for example. The pin inserted through through-hole 165 may be, for example, a McMaster-Carr #90145A414.

In one aspect, gripping member 150 is provided to pivot inwardly when an object, such as the aforementioned insert, encounters the leading or forwardmost edge of the lower end of the pivot arm. This inward pivoting motion exposes a height-wise portion of the indented portion 140*b* sufficient to receive an insert, which could comprise a range of thickness. An assist member comprising one or more rollers (e.g., elastomeric rollers)(see FIG. 9) may be provided, at an upstream (upper left side) of the continuous motion inserting machine 180 depicted in FIG. 7, which lightly press down upon an insert to control the insert as the insert travels forward and into position for engagement with pusher member indented portion 140*b* and gripper means 150. The forward motion imparted to the insert is provided by interface pins acting on a back side of the insert over a portion of the insert feed path up to the point at time in which the pusher members 140 engage and carry the insert. The interface pins are disposed to travel in a feed direction of the insert while acting along the back side of the insert at a location which will not interfere with the motion of the pusher elements. The pusher elements travel along a path in which they descend from above and behind the moving insert to engage a back side of the insert as it travels forward.

In another aspect, an assist member (not shown) may be provided along the path of travel of the pusher member 140 so as to impart a force to a forward or leading edge of the pivot arm immediately prior to contact of the pivot arm by the insert to slightly bias the pivot arm inwardly to facilitate entry of the insert (i.e., an edge thereof) into the indented portion 140*b*.

It is noted that alternative arrangements of pivot points and spring types are contemplated as being within the scope of the embodiment. For example, the leading portions of pusher member 140 could be configured to receive a helical torsion spring acting either about the pivot point of the gripping member 150 or displaced therefrom depending upon the terminus configuration of the torsion spring. Additional configurations within the scope of the present concepts could employ a compression spring acting below the pivot point of the gripping member 150 to provide a biasing force against inward movement of the lower end of the gripper means 150 into the indented portion 140*b*. Still further configurations within the present concepts could employ a vertically translatable gripping member, such as the aforementioned pivot arm or even a lightweight roller ball or wheel configured to provide, in combination with a suitably placed spring (e.g., a tension or compression spring), a desired downward force against the pusher member 140 upper inner portion of lower portion 140*a*. In such a configuration, the vertically translatable gripper means 150 may be configured to co-act with a guide placed along and adjacent the path of travel of the pusher member 140 to provide the motive force for vertical displacement of the gripper means. In other words, the guide could force the gripper means 150 from a first state to a second state as the pusher element 140 travels across the guide.

During forward or downstream conveyance of the insert, the gripping member 150 provides a downward force biasing the insert against the pusher member 140 lower portion 140*a* to ensure that the insert does not slip relative to the pusher member 140.

Figure 9:
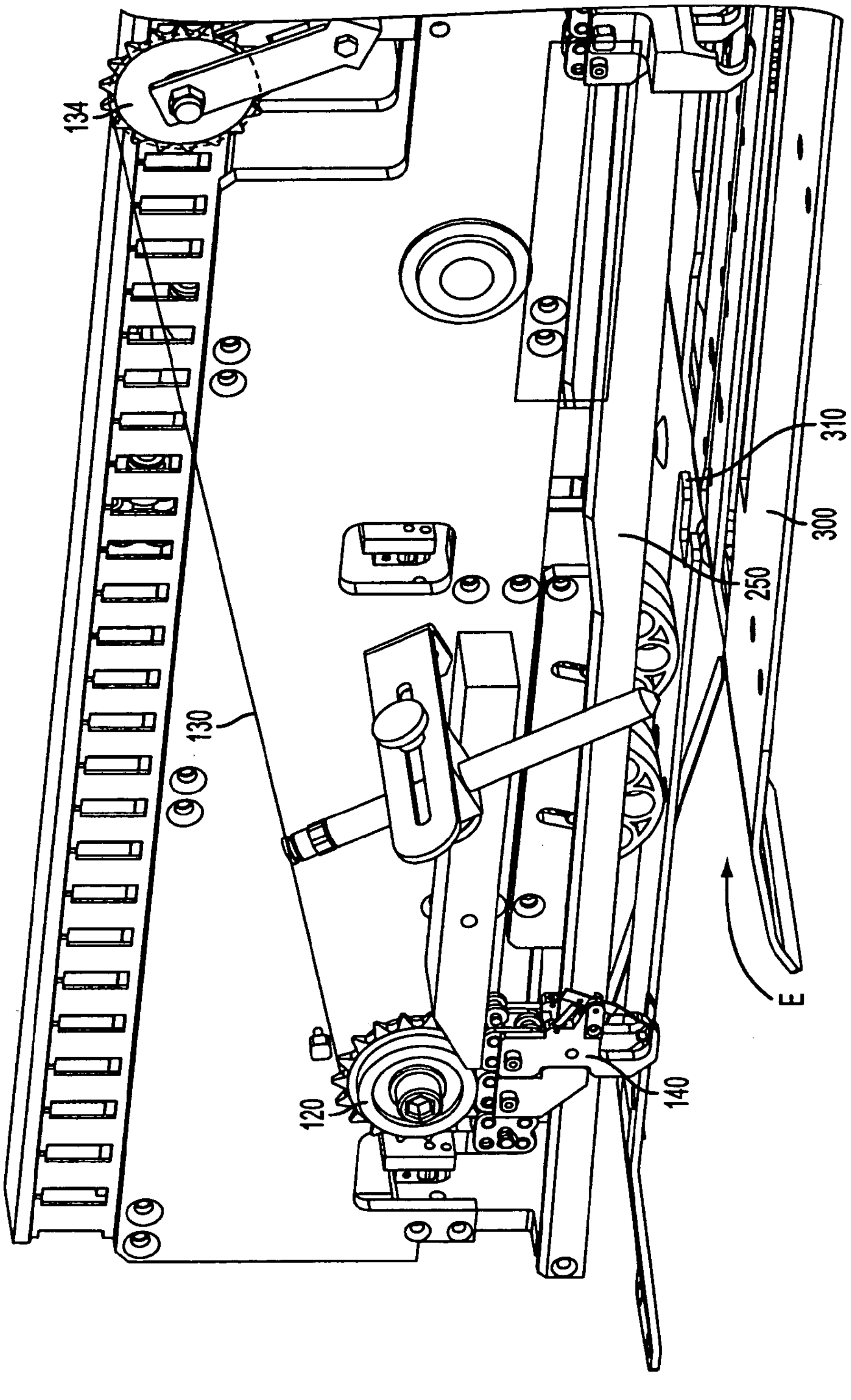
FIG. 9 of the drawings shows a perspective view of the pusher guide assembly in accord with the embodiment, showing the relation between the upper package insertion device and a top plate of a lower envelope conveying device.
Figure 10:
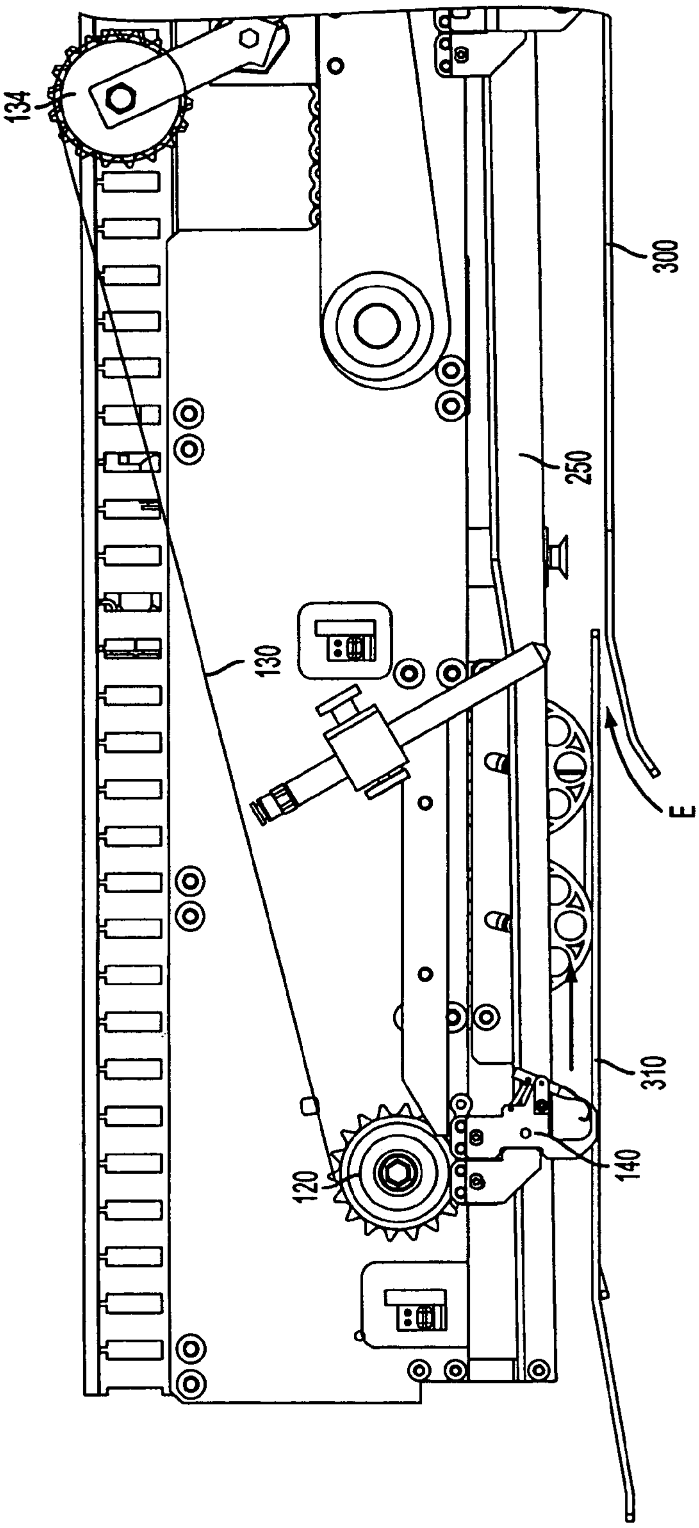
FIG. 10 of the drawings shows a side view of the pusher guide assembly in accord with the embodiment, showing the relation between the upper package insertion device and the lower envelope conveying device.

An aspect of an apparatus in which the pusher members may advantageously be utilized is shown in FIGS. 9–10. As shown in FIGS. 9–10, for example, the movement of an envelope is denoted by an arrow E passing upwardly between lower plate 300 and upper guide plate 310 and the movement of pusher member 140 is also denoted by an arrow. In one aspect, as pushing member 140 arcs around sprocket 120, as shown in FIGS. 9–10, pushing member 140 encounters and retains an insert (not shown) provided thereto by an appropriate insert feed device prior to passage beyond upper guide plate 310.

The envelope is conveyed in a position wherein the leading edge of the envelope is the bottom edge of the envelope and the open flap of the envelope is the trailing edge with the open flap being on the bottom (i.e., the envelope is face-down). Although not shown, the envelope is stopped, for a few milliseconds, by a registration stop acting in concert with lower plate 300. A vacuum may then be imparted by upper and lower vacuum members (not shown), during the fleeting registration of the envelope, to both the upper and lower sides of the envelope to partially open the envelope and prepare the envelope for receipt of the insert carried by pusher members 140. As the envelope is held in the partially open position by the vacuum members, inserting fingers 210, which may in one aspect be shaped in a substantially "taco-like" form, arc around cams 400, 410 in a clockwise direction (as viewed from above) and approach the partially open envelope from the rear in the vicinity of a beginning portion 215 of the envelope travel path within the insertion device.

As the inserting fingers 210 approach and engage the left and right sides of the envelope, the outer surfaces of the inserting fingers 210 (e.g., outer surfaces of the "taco") further open and/or retain the open position of the envelope as an upper vacuum member is disengaged from the envelope back surface, which is face-up. The lug 211 of the inserting fingers abuts against the left and right top edges of the envelope and continued motion of the continuously moving inserting fingers 210 starts to push the envelope forward. Substantially simultaneously with the engagement of the envelope by the inserting fingers 210, the pushing members 140 bearing the insert approach an inner surface of the inserting fingers 210 tangentially as the inserting fingers 210 arc around cams 400, 410 and the outer leading edges of the insert engage inner surfaces of the around cams 400, 410 (e.g., inner surfaces of the "taco") which support and/or guide the insert into place within the envelope, which in one aspect may already be moving by virtue of the inserting fingers 210. The lower vacuum may advantageously be maintained as the envelope continues its downstream travel so as to provide a backforce to facilitate insertion of the insert into the envelope. At some point during the insertion of the insert into the envelope, preferably when the insertion is at least substantially complete, the forward motion of the pusher members 140 removes the stuffed envelope from the insertion fingers 210 (e.g., the velocity of the pusher member 140 is greater than that of the insertion fingers 210).

Proper alignment of the pusher member 140 and the insert, realized in one example by the structure described and depicted herein, enables accurate insertion of the insert into the envelope and is further assisted by the inner surface of the inserting fingers.

Once the insert has been conveyed into the envelope, the combined envelope and insert is then accelerated away from pusher member 140. In one aspect, this disengagement of the combined envelope and insert from the pusher members 140 is achieved by utilizing a powered (e.g., motor-driven) roller cylinder or drum or a belt provided over a roller cylinder or drum, with one component of the belt driven systems being powered (e.g., motor-driven)(hereinafter simply "drum"), disposed under the path of the filled envelope, rotating such that an outer circumference of the drum is moving in the downstream direction at a velocity greater than that of the filled envelope and pusher member 140 immediately upstream of the drum. A stabilizing roller device is disposed above the path of the filled envelope and above the centerline of the drum to provide a slight downwardly biasing force to stabilize the filled envelope as it is accelerated by the rotating drum. The stabilizing roller device may comprise one or more vertically translatable elements, such as passive or reactive rollers disposed on a pneumatic, hydraulic, or solenoid powered piston. Alternatively, the stabilizing roller device may comprise rollers configured to rotate at a predetermined velocity matching that of the rotating drum. Still further, the stabilizing roller device may comprise a substantially stationary drum configured to permit setting of the drum at one of a plurality of preselected displacements from the centerline of the lower drum so as to provide a predetermined gap therebetween corresponding substantially to the thickness of filled envelopes conveyed therethrough. The combination of the rotating drum and the stabilizing roller device are configured, in combination, to accelerate both the envelope and the insert disposed therein away from the pusher member 140 such that the insert is pulled away from the gripping member 150 in a controlled manner. The orientations of the rotating drum (or belt) and the stabilizing roller device may also be reversed.

It is noted that other devices and methods may be used to disengage the insert (and envelope bearing the insert) from the pusher member 140 gripping member 150. For example, another gripping element or plurality of gripping elements could grip the envelope (and insert borne therein) and accelerate the insert away from the pusher member 140 gripping member 150.

Figure 7:
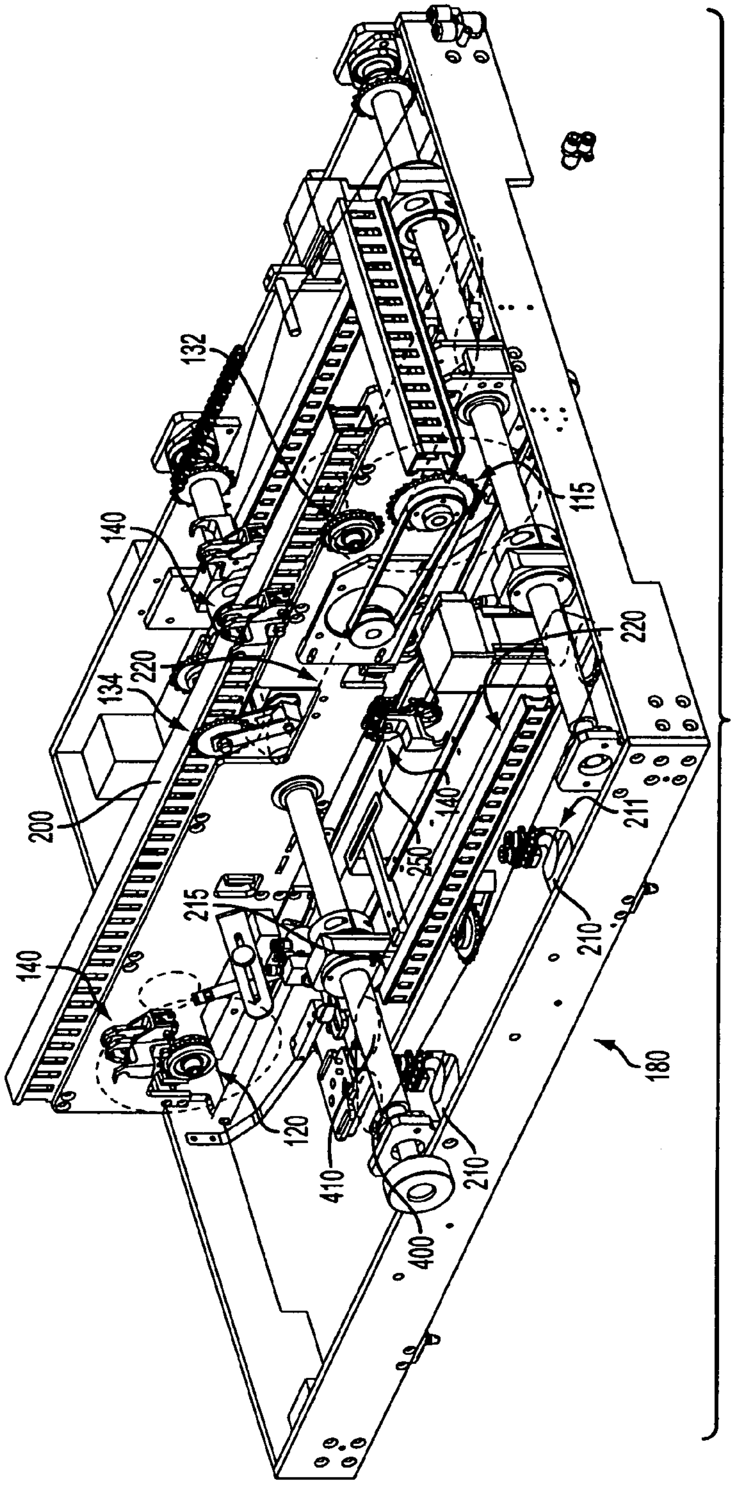
FIG. 7 of the drawings shows a perspective view of an implementation of a pusher guide assembly in accord with the embodiment, used in an envelope package insertion device.
Figure 8:
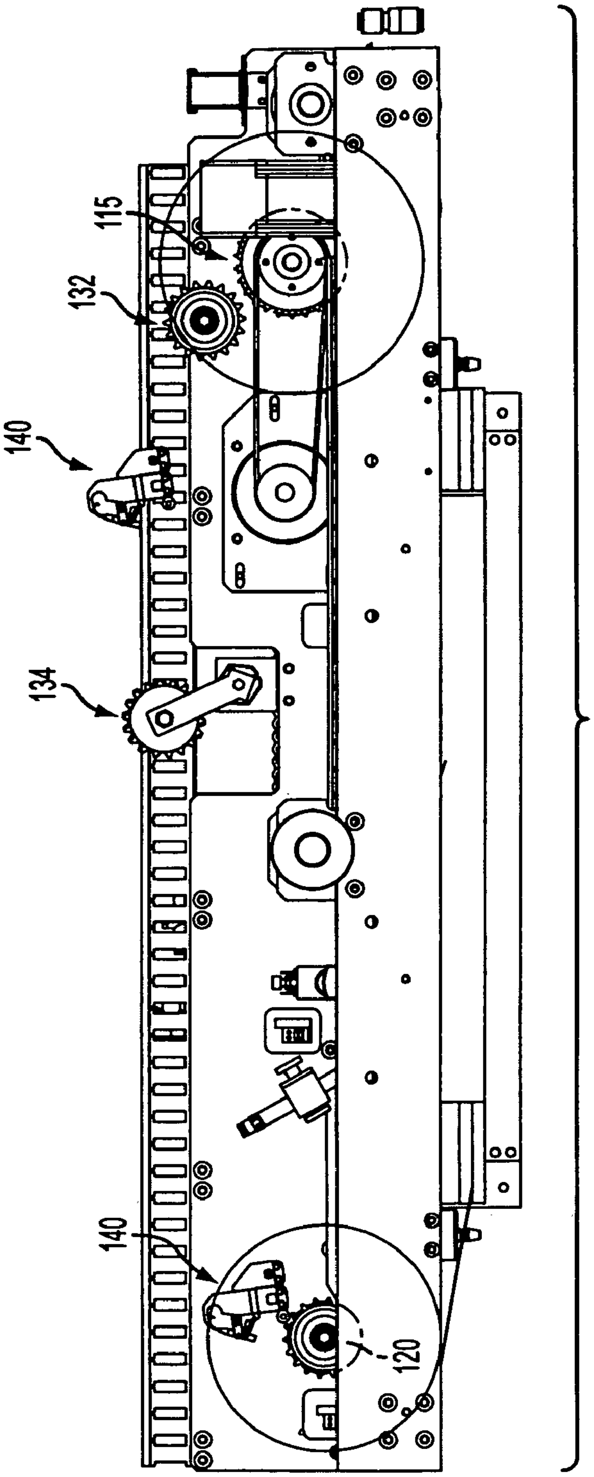
FIG. 8 of the drawings shows a side view of the pusher guide assembly in accord with the embodiment, used in an envelope package insertion device of FIG. 7.

FIGS. 7 and 8 depict one embodiment of a continuous motion inserting machine 180 in which the aforementioned pusher members 140 are utilized. A plurality of pusher members 140 are arranged at predetermined intervals along a drive chain (not shown) provided around sprockets 115, 120, 132 and 134. Two such drive chains are provided and are disposed at substantially equal distances from a center of the device, indicated generally by center member 200. As depicted in FIG. 7, the pusher members 140 are driven in a counter-clockwise direction toward an upper left-hand portion of FIG. 7, where they engage sprocket 120 and are rotated downwardly to a bottom portion of the continuous motion inserting machine 180. The sidewalls 142 of the pusher members 140 are positioned to straddle guide member 250 in a manner similar to that disclosed in U.S. Pat. No. 6,283,276, incorporated herein by references in its entirety. Guide member 250 is substantially rectangular and optionally possesses chamfered or angled portions extending along a longitudinal direction of the guide member on upper surfaces thereof.

The downwardly directed indented portions 140*b* of the pusher elements 140 are positioned, by virtue of guide 250, to receive an insert.

The above description is given with reference to an overhead pusher finger guide system, wherein the pusher members comprise a gripping member. However, it will be understood that various details may be changed without departing from the broad outlines of the scope of the invention provided herein. Furthermore, the foregoing description is for purpose of illustration only, and not for purpose of limitation. The dimensions indicated in the appended Figures are for illustrative purposes only and may be readily varied to suit different applications and environments. For example, the spacing between the sidewalls 142 may be increased or decreased to accommodate wider or narrower chain or driving means configurations. The height of the sidewalls 142 and placement of the pusher member 140 lower end 140*a* may be adjusted to suit different configurations of guide member 250 and/or insert placements. As noted above, the gripping member configuration may be adapted in a myriad of ways to achieve the desired result of providing a slight downward force on an insert received within the indented portion 140*b* of the pusher member 140, which incidentally may be configured to be shallower or deeper, as desired for the particular configuration of equipment. Supporting member 141 may be optionally omitted. Finally, pusher member 140 may comprise lightweight, durable materials other than Nylatron GS, such materials being known or easily ascertained by one of ordinary skill in the art.

The invention claimed is:

1. An envelope insert conveyor assembly, comprising:

a first pair of rotation members and a second pair of rotation members spaced apart from one another;

a first conveying member disposed around the first pair of rotation members and a second conveying member disposed around the second pair of rotation members, so as to rotate around the first rotation member and the second rotation member; and a plurality of pusher members fixed to each of the first conveying member and second conveying member, each pusher member comprising paired sidewalls, a cross-wall connecting the paired walls, an indented portion provided in each of the paired sidewalls, and a gripping element disposed adjacent an indented portion of one of the paired sidewalls and biased toward an interior surface of the indented portion, wherein the gripping element gripping member is biased by a spring against the insert under action of the spring toward the interior lower surface of the indented portion to retain the insert within the indented portion during motion of the gripping element.

2. An envelope insert conveyor assembly according to claim 1, wherein each gripping element comprises a gripping member mounted for rotation about a pivot point formed by a pin inserted through a hole in a forwardly extending portion of a corresponding pusher member.

3. An envelope insert conveyor assembly according to claim 2, wherein the pivot point of the gripping member is within a middle portion of the gripping member, wherein an attachment point for one end of the spring is within an upper portion of the gripping member, and wherein an attachment point for another end of the spring is provided on the pusher member.

4. An envelope insert conveyor assembly according to claim 3, wherein a lower portion of the gripping member comprises a curved portion, and wherein a middle portion of the curved portion is configured to contact the interior lower surface of the indented portion, and wherein a distal end of the curved portion curves upwardly away from the interior lower surface of the indented portion.

5. An envelope insert conveyor assembly according to claim 4, wherein the attachment point provided on the pusher member for said another end of the spring is disposed on a forward portion of a pusher member sidewall.

6. An envelope insert conveyor assembly according to claim 5, further comprising:

a supporting member attached to the conveyor chain behind each of the pusher members, wherein each of the supporting members comprises downwardly protruding extensions corresponding in shape and spacing to one of the outer set of link elements and inner set of link elements;

wherein the supporting members are connected to the first conveying member and second conveying member chains by the downwardly protruding extensions.

7. An envelope insert conveyor assembly according to claim 6, wherein a rear portion of each of the pusher members comprises a recess, wherein the supporting members comprise a generally H-shaped element having two upwardly directed walls and a horizontal cross-wall, the upwardly directed walls comprising forward projections configured to engage the recesses in the rear portion of the pusher members when a respective one of the conveying members is moving in a substantially straight line and is configured to at least partially disengage from the recesses in the rear portion of the pusher elements when a respective one of the conveying members moves along a curved path, and wherein the engagement of the supporting member forward projections and the pusher members supports the pusher members.

8. An envelope insert conveyor assembly according to claim 7, wherein the gripping member is configured to pivot inwardly into the indented portion of the pusher member when an insert encounters a leading edge of the gripping member, and wherein the inward pivoting motion exposes a heightwise portion of the indented portion sufficient to receive the insert.

9. An envelope insert conveyor assembly, comprising:

a first pair of rotation members and a second pair of rotation members spaced apart from one another;

a first conveying member disposed around the first pair of rotation members and a second conveying member disposed around the second pair of rotation members, so as to rotate around the first rotation member and the second rotation member; and a plurality of pusher members fixed to each of the first conveying member and second conveying member, each pusher member comprising paired sidewalls, a cross-wall connecting the paired walls, an indented portion provided in each of the paired sidewalls, and a gripping element disposed adjacent an indented portion of one of the paired sidewalls and biased toward an interior surface of the indented portion;

an assist member comprising one or more rollers;

a continuous motion inserting machine; and a lower guide plate and an opposing upper guide plate provided downstream of the assist member, wherein the lower guide plate and upper guide plate are positioned to control movement of envelopes prior to contact between the insert borne by the pusher members and the envelopes and wherein the assist member is provided upstream of the continuous motion inserting machine to control the inserts prior to engagement of each insert by the pusher members.

10. An envelope insert conveyor assembly according to claim 9, wherein the envelopes are conveyed in a position wherein a leading edge of the envelope is the bottom edge of the envelope and an open flap of the envelope is the trailing edge.

11. An envelope insert conveyor assembly according to claim 10, further comprising:

a lower vacuum member provided adjacent the lower guide plate to face an envelope path, an upper vacuum member provided in opposition to the lower vacuum member, wherein the upper vacuum member and lower vacuum member coact to at least partially open each envelope and prepare each envelope for receipt of an insert carried by a corresponding pair of pusher members.

12. An envelope insert conveyor assembly according to claim 11, further comprising:

a third pair of rotation members having a third conveying member disposed therearound;

a fourth pair of rotation members having a fourth conveying member disposed around therearound, the third conveying member and fourth conveying member being spaced apart from one another, and a plurality of inserting fingers disposed on the third conveying member and fourth conveying member, wherein the movement of the third conveying member and fourth conveying member causes the plurality of inserting fingers to approach each of the open envelopes from the rear prior to contact between the insert borne by the pusher members and each of the open envelopes.

13. An envelope insert conveyor assembly according to claim 12, wherein inserting fingers on the third conveying member engage inner surfaces of one of the left and right sides of each of the open envelopes, wherein inserting fingers on the fourth conveying member engage inner surfaces of the other one of the left and right sides of each of the open envelopes, and wherein outer surfaces of the inserting fingers space apart the upper and lower sides of each of the open envelopes to facilitate insertion of an insert conveyed by the pusher members.

14. An envelope insert conveyor assembly according to claim 13, wherein at least one of the lower vacuum member and upper vacuum member disengages from a respective one of the open envelope bottom surface and the open envelope top surface substantially concurrent with a substantially full insertion of the inserting fingers therein.

15. An envelope insert conveyor assembly according to claim 14, wherein the inserting fingers are substantially U-shaped in cross-section, and wherein an inner portion of the U-shaped cross section is configured to guide inserts borne by the pusher members into a corresponding one of the plurality of open envelopes.

16. An envelope insert conveyor assembly according to claim 15, wherein a differential velocity of the pusher members and the insertion fingers is selected so that, upon at least substantial insertion of each insert into each of a corresponding one of the plurality of open envelopes to form stuffed envelopes, the forward motion of the pusher members removes the stuffed envelopes from the insertion fingers.

17. An envelope insert conveyor assembly according to claim 15, further comprising:

a rotating output drum powered by a power source, wherein the linear velocity of an outer surface of the rotating output drum is greater than a linear velocity of the pusher members, and wherein the rotating output member accelerates the stuffed envelopes away from the pusher members following disengagement of the combined envelope and insert from the insertion fingers.

18. An envelope insert conveyor assembly according to claim 17, further comprising:

a stabilizing roller disposed above the path of the stuffed envelopes and above the rotating output drum to provide a slight downwardly biasing force to stabilize the stuffed envelopes as they are accelerated by the rotating output drum.

19. A pusher member for conveying an envelope insert, comprising:

paired sidewalls;

a cross-wall connecting the paired walls;

wherein each of the paired sidewalls comprises, at a proximal end, downwardly protruding extensions comprising an attachment member adapted for attachment to a chain, wherein each of the paired sidewalls comprises a forwardly disposed generally U-shaped indented portion, wherein one of the generally U-shaped indented portions comprises a gripping element having a gripping member which is resiliently biased toward an interior surface of the indented portion, wherein the generally U-shaped indented portions are dimensioned to receive an insert comprising at least one of a sheet of paper, plural sheets of paper, a packet, a folded sheet of paper, and plural folded sheets of paper, and wherein the gripping element gripping member is biased by a spring toward an interior surface of the indented portion.

20. A pusher member for conveying an envelope insert according to claim 19, wherein a lower portion of the gripping member comprises a curved portion, and wherein a middle portion of the curved portion is configured to contact the interior lower surface of the indented portion, and wherein a distal end of the curved portion curves upwardly away from the interior lower surface of the indented portion.

* * * * *